(12) United States Patent
Tsuda et al.

(10) Patent No.: US 9,334,353 B2
(45) Date of Patent: May 10, 2016

(54) METHOD FOR PRODUCING POLYMER PARTICLES, POLYMER PARTICLES, FILLER FOR CHROMATOGRAPHY COLUMN, AND CHROMATOGRAPHY COLUMN

(71) Applicant: JSR Corporation, Minato-ku (JP)

(72) Inventors: Sachiko Tsuda, Minato-ku (JP); Ryou Tsuda, Minato-ku (JP); Kouji Tamori, Minato-ku (JP)

(73) Assignee: JSR CORPORATION, Minato-ku (JP)

( * ) Notice: Subject to any disclaimer, the term of this patent is extended or adjusted under 35 U.S.C. 154(b) by 0 days.

(21) Appl. No.: 14/400,698

(22) PCT Filed: May 10, 2013

(86) PCT No.: PCT/JP2013/063176
§ 371 (c)(1),
(2) Date: Nov. 12, 2014

(87) PCT Pub. No.: WO2013/172266
PCT Pub. Date: Nov. 21, 2013

(65) Prior Publication Data
US 2015/0166705 A1    Jun. 18, 2015

(30) Foreign Application Priority Data

May 14, 2012 (JP) ................................. 2012-110450
May 14, 2012 (JP) ................................. 2012-110451

(51) Int. Cl.
| | | |
|---|---|---|
| *A61K 47/48* | (2006.01) | |
| *C08F 222/38* | (2006.01) | |
| *B01J 20/28* | (2006.01) | |
| *B01J 20/26* | (2006.01) | |
| *B01J 20/285* | (2006.01) | |
| *B01D 15/38* | (2006.01) | |
| *B01J 20/286* | (2006.01) | |
| *B01J 20/30* | (2006.01) | |
| *C08G 63/48* | (2006.01) | |

(52) U.S. Cl.
CPC ........ *C08F 222/385* (2013.01); *B01D 15/3804* (2013.01); *B01J 20/261* (2013.01); *B01J 20/267* (2013.01); *B01J 20/285* (2013.01); *B01J 20/286* (2013.01); *B01J 20/28016* (2013.01); *B01J 20/28059* (2013.01); *B01J 20/3085* (2013.01); *B01J 2220/80* (2013.01)

(58) Field of Classification Search
CPC .............................. C08G 69/04; C08G 69/28
USPC ......... 524/431, 434, 457, 458, 459, 460, 461, 524/503; 528/310, 366, 391; 525/54.1
See application file for complete search history.

(56) References Cited

U.S. PATENT DOCUMENTS

| | | | |
|---|---|---|---|
| 3,865,723 A | 2/1975 | Marchisio et al. | |
| 4,459,396 A * | 7/1984 | Yamasaki et al. | ............. 526/200 |
| 6,423,666 B1 | 7/2002 | Liao et al. | |
| 2002/0143138 A1 | 10/2002 | Moszner et al. | |
| 2006/0084765 A1 | 4/2006 | Muranaka et al. | |
| 2006/0247329 A1 | 11/2006 | Moszner et al. | |
| 2008/0103223 A1 | 5/2008 | Klee et al. | |
| 2008/0210615 A1 | 9/2008 | Joehnck et al. | |
| 2011/0091727 A1 | 4/2011 | Joehnck et al. | |
| 2014/0155565 A1 | 6/2014 | Joehnck et al. | |

FOREIGN PATENT DOCUMENTS

| | | |
|---|---|---|
| JP | 49-14599 A | 2/1974 |
| JP | 02-099860 A | 4/1990 |
| JP | 02-221300 A | 9/1990 |
| JP | 2002-212019 A | 7/2002 |
| JP | 2003-511659 A | 3/2003 |
| JP | 2005-60531 A | 3/2005 |
| JP | 2006-111717 A | 4/2006 |
| JP | 2006-306871 A | 11/2006 |
| JP | 2009-503203 A | 1/2009 |
| JP | 2009-542740 A | 12/2009 |

OTHER PUBLICATIONS

International Search Report and Written Opinion issued Aug. 6, 2013 in PCT/JP2013/063176 filed May 10, 2013.
Office Action issued Dec. 8, 2015, in corresponding Japanese Patent Application No. 2012-110450, with English translation.
Office Action issued Dec. 15, 2015, in corresponding Japanese Patent Application No. 2012-110451, with English translation).

* cited by examiner

*Primary Examiner* — Terressa Boykin
(74) *Attorney, Agent, or Firm* — Oblon, McClelland, Maier & Neustadt, L.L.P.

(57) ABSTRACT

To provide a method for producing polymer particles from an acrylamide monomer by a normal phase suspension polymerization method, polymer particles, a packing material for a chromatography column using the particles, and a chromatography column. A method for producing polymer particles, comprising dispersing a monomer composition comprising a multifunctional monomer having a plurality of N-substituted acrylamide groups in an aqueous medium; and polymerizing the dispersed monomer composition.

15 Claims, 1 Drawing Sheet

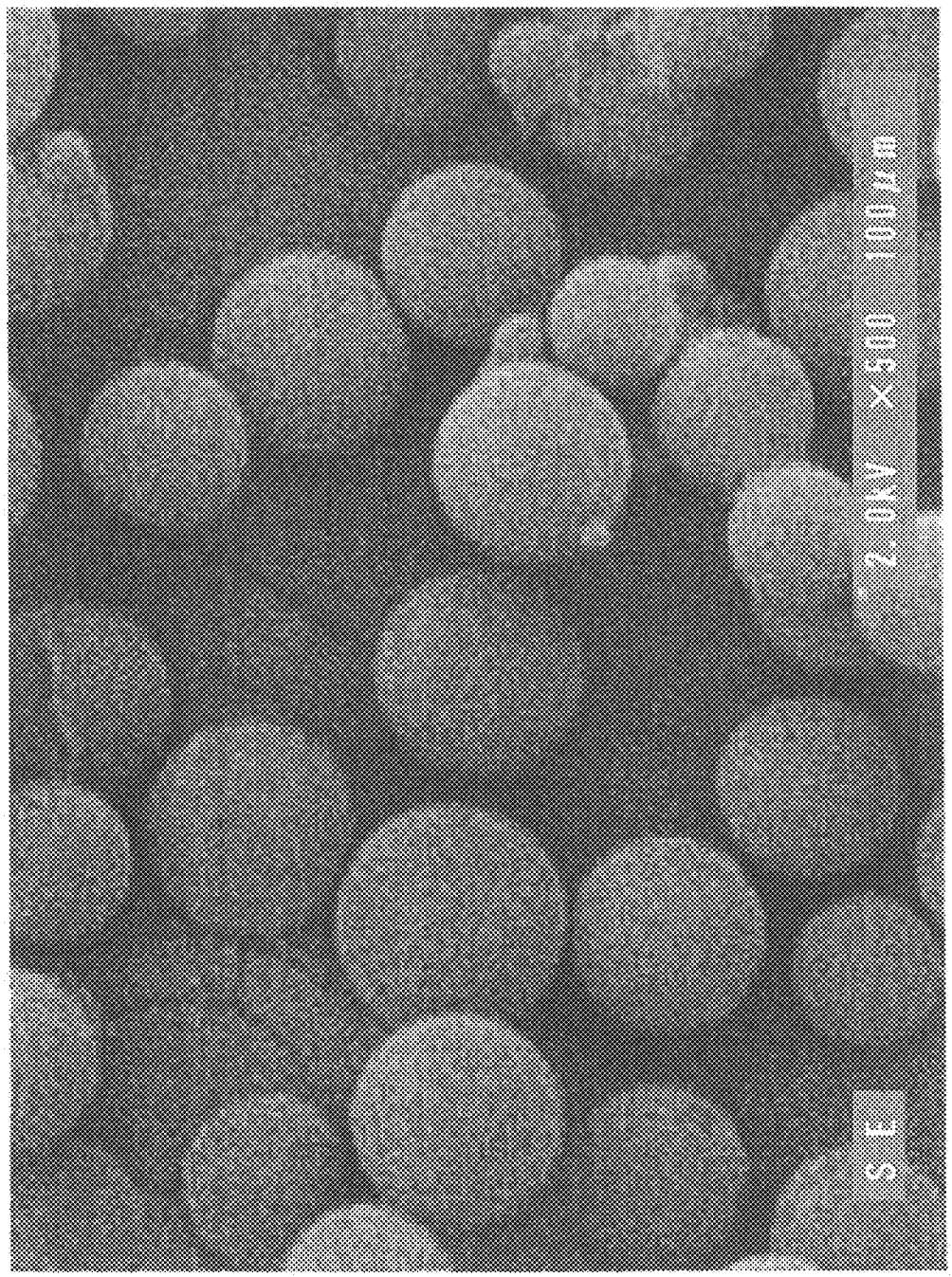

METHOD FOR PRODUCING POLYMER PARTICLES, POLYMER PARTICLES, FILLER FOR CHROMATOGRAPHY COLUMN, AND CHROMATOGRAPHY COLUMN

FIELD OF THE INVENTION

The present invention relates to a method for producing polymer particles, polymer particles, a packing material for a chromatography column using the particles, and a chromatography column.

BACKGROUND OF THE INVENTION

Conventionally, as supports for chromatography, particles of synthetic polymers such as poly(meth)acrylates and poly (meth)acrylamides and natural polymers such as polysaccharides have been used. Among these, particles of synthetic polymers are produced by a method of polymerizing a monomer hydrophobized with a protecting group or the like, or either method of normal phase suspension polymerization (O/W type) and reversed phase suspension polymerization (W/O type).

When hydrophobization is performed, the secondary treatment of conversion into a hydrophilic group must be performed after polymerization. Problems of the reversed phase suspension polymerization are that a large amount of an organic solvent is required, and the particle preparation step is complicated. But, since an acrylamide monomer generally has low solubility in an organic solvent, normal phase suspension polymerization using this has not been performed so far. For the preparation of polyacrylamide particles using an acrylamide monomer, generally, the method of polymerizing a monomer hydrophobized with a protecting group or the like, or a method of polymerizing by reversed phase suspension is adopted (Patent Documents 1 to 3). Problems of such reversed phase suspension polymerization are that a large amount of an organic solvent is required, and the particle preparation step is complicated. When hydrophobization is performed, the secondary treatment of conversion into a hydrophilic group must be performed after polymerization.

Patent Documents 4 and 5 report the use of a polymer using a tertiary acrylamide-based crosslinkable monomer as a dental material. These disclose compositions for making up for the loss of teeth and do not relate to polymer particles.

CITATION LIST

Patent Document

[Patent Document 1] JP-A-2003-511659
[Patent Document 2] JP-A-2009-503203
[Patent Document 3] JP-A-2006-111717
[Patent Document 4] JP-A-2002-212019
[Patent Document 5] JP-A-2009-542740

SUMMARY OF THE INVENTION

Problem to be Solved by the Invention

A problem to be solved by the present invention is to provide a method for producing polymer particles from an acrylamide monomer by a normal phase suspension polymerization method, polymer particles, a packing material for a chromatography column using the particles, and a chromatography column.

Means for Solving the Problem

Accordingly, the present inventors carried out an extensive investigation and, as a result, found that polymer particles can be produced from an acrylamide monomer by the normal phase suspension polymerization method by dispersing a monomer composition comprising a multifunctional monomer having a plurality of N-substituted acrylamide groups in an aqueous medium, and polymerizing the monomer composition. Thus, they accomplished the present invention.

Specifically, the present invention provides a method for producing polymer particles, comprising steps of dispersing a monomer composition comprising a multifunctional monomer having a plurality of N-substituted acrylamide groups in an aqueous medium; and polymerizing the dispersed monomer composition.

In addition, the present invention provides polymer particles produced by the above production method.

Further, the present invention provides polymer particles comprising a structure represented by the following formula (2):

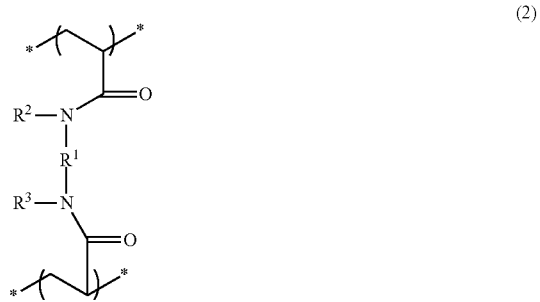

wherein $R^1$ represents an alkylene group having 2 to 8 carbon atoms, $R^2$ and $R^3$ represent an alkyl group having 1 to 3 carbon atoms, and $R^2$ and $R^3$ optionally together form a heterocycle with an adjacent nitrogen atom and $R^1$, provided that a total number of carbon atoms of $R^1$, $R^2$, and $R^3$ is 5 or more.

Further, the present invention provides a packing material for a chromatography column comprising the above polymer particles as a support.

Further, the present invention provides a packing material for affinity chromatography comprising the above polymer particles having a ligand immobilized thereon.

Further, the present invention provides a chromatography column packed with the above packing material.

Effect of the Invention

According to the present invention, polymer particles can be produced from an acrylamide monomer by the normal phase suspension polymerization method.

In addition, the polymer particles comprising the structure represented by the formula (2) according to the present invention have excellent alkali resistance and antifouling properties, and have high binding capacity for a biopolymer when a ligand is immobilized, and are useful as a support for chromatography.

BRIEF DESCRIPTION OF DRAWING

FIG. 1 is an SEM photograph of the polymer particles of Example 1.

DETAILED DESCRIPTION OF THE INVENTION

A method for producing polymer particles according to the present invention comprises the step of dispersing a monomer composition (also referred to as a polymerizable composition) comprising a multifunctional monomer having a plurality of N-substituted acrylamide groups in an aqueous medium, and polymerizing the above monomer composition. The above monomer composition means a composition containing a monomer. The polymer particles mean a particulate polymer.

The multifunctional monomer used in the present invention has a plurality of N-substituted acrylamide groups. As the N-substituted acrylamide group of the multifunctional monomer, an acrylamide group having an alkyl group having 1 to 3 carbon atoms substituted on a nitrogen atom is preferred in terms of obtaining polymer particles with little gel adhesion.

In addition, the number of N-substituted acrylamide groups is preferably 2 to 6, more preferably 2 to 4, and particularly preferably 2, per one molecule in terms of obtaining the polymer particles with little gel adhesion.

Preferred specific examples of the above multifunctional monomer include one represented by the following formula (1). By using such a multifunctional monomer, the polymer particles can be efficiently obtained by a normal phase suspension polymerization method.

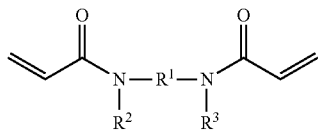

(1)

wherein $R^1$ represents an alkylene group having 2 to 8 carbon atoms, $R^2$ and $R^3$ represent an alkyl group having 1 to 3 carbon atoms, and $R^2$ and $R^3$ may together form a heterocycle with an adjacent nitrogen atom and $R^1$, provided that the total number of carbon atoms of $R^2$, and $R^3$ is 5 or more.

Here, the alkylene group having 2 to 8 carbon atoms represented by $R^1$ may be linear or branched. Examples thereof include an ethane-1,1-diyl group, an ethane-1,2-diyl group, a propane-1,1-diyl group, a propane-1,2-diyl group, a propane-1,3-diyl group, a propane-2,2-diyl group, a butane-1,2-diyl group, a butane-1,3-diyl group, a butane-1,4-diyl group, a pentane-1,4-diyl group, a pentane-1,5-diyl croup, a hexane-1,5-diyl group, a hexane-1,6-diyl group, a heptane-1,7-diyl group, and an octane-1,8-diyl group. The number of carbon atoms of the alkylene group is preferably 3 to 8, more preferably 3 to 6.

As the alkyl group having 1 to 3 carbon atoms represented by $R^2$ and $R^3$, a methyl group or an ethyl group is preferred, and both of $R^2$ and $R^3$ are more preferably methyl group or ethyl group, further preferably ethyl group.

In addition, $R^2$ and $R^3$ may together form a heterocycle with adjacent nitrogen atoms and $R^1$. Examples of such a heterocyclic group include a 2-methylpiperazine-1,4-diyl group, a 2-ethylpiperazine-1,4-diyl group, a 2,5-dimethylpiperazine-1,4-diyl group, a 2,5-diethylpiperazine-1,4-diyl group, a 1,4-perhydrodiazepine-1,4-diyl group, a 6-methyl-1,4-perhydrodiazepine-1,4-diyl group, and an 6-ethyl-1,4-perhydrodiazepine-1,4-diyl group.

In addition, the total number of carbon atoms of $R^1$, $R^2$, and $R^3$ is 5 or more, and is preferably 5 to 15, more preferably 5 to 12, further preferably 6 to 10, and particularly preferably 7 to 9 in terms of efficiently obtaining the polymer particles by the normal phase suspension polymerization method and in terms of alkali resistance, antifouling properties, and the like.

In addition, preferred specific examples of the multifunctional monomer used in the present invention include N,N'-diethyl-1,3-bis(acrylamido)propane (DEAAP) [solubility parameter: 22.6 $(MPa)^{1/2}$], N,N'-diethyl-1,6-bis(acrylamido)hexane (DEAAH) [21.7 $(MPa)^{1/2}$], 1,4-bis(acryloyl)piperazine (BAP) [23.6 $(MPa)^{1/2}$], N,N'-diethyl-1,4-bis(acrylamido)butane [22.3 $(MPa)^{1/2}$], N,N'-diethyl-1,5-bis(acrylamido)pentane [22.0 $(MPa)^{1/2}$], N,N'-dimethyl-1,3-bis(acrylamido)propane [23.4 $(MPa)^{1/2}$], N',N'-dimethyl-1,6-bis(acrylamido)hexane [22.3 $(MPa)^{1/2}$], N,N'-dimethyl-1,4-bis(acrylamido)butane [23.0 $(MPa)^{1/2}$], and N,N'-dimethyl-1,5-bis(acrylamido)pentane [22.6 $(MPa)^{1/2}$]. Such monomer can be used singly, or two or more of them can be mixed and used.

Among these, N,N'-diethyl-1,3-bis(acrylamido)propane (DEAAP), N,N'-diethyl-1,6-bis(acrylamido)hexane (DEAAH), N,N'-diethyl-1,4-bis(acrylamido)butane, N,N'-diethyl-1,5-bis(acrylamido)pentane, N,N'-dimethyl-1,3-bis(acrylamido)propane, N,N'-dimethyl-1,6-bis(acrylamido)hexane, N,N'-dimethyl-1,4-bis(acrylamido)butane, and N,N'-dimethyl-1,5-bis(acrylamido)pentane are preferred when polymer particles having excellent alkali resistance and antifouling properties, and having high binding capacity for a biopolymer when a ligand is immobilized are obtained.

The solubility parameter used herein means an SP value calculated by the fedors method, and the solubility parameter δ of a compound is obtained by the following formula.

$$\delta = (\Delta E/\Delta V)^{1/2} (MPa)^{1/2}$$

wherein ΔE represents evaporation energy (J/mol), and ΔV represents molar volume (cm³/mol) at 25° C.

In addition, the solubility parameter δ of the above multifunctional monomer is preferably 10.0 $(MPa)^{1/2}$ or more and 30.0 $(MPa)^{1/2}$ or less, more preferably 15.0 $(MPa)^{1/2}$ or more and 25.0 $(MPa)^{1/2}$ or less, further preferably 17.5 $(MPa)^{1/2}$ or more and less than 24.0 $(MPa)^{1/2}$, further preferably 20.0 $(MPa)^{1/2}$ or more and 23.5 $(MPa)^{1/2}$ or less, and further preferably 21.0 $(MPa)^{1/2}$ or more and 23.0 $(MPa)^{1/2}$ or less in terms of obtaining the polymer particles with little gel adhesion.

In addition, the amount of the above multifunctional monomer used is preferably 20 to 99% by mass, more preferably 50 to 90% by mass, based on the total amount of monomers in terms of the mechanical strength of the polymer particles, and pressure performance particularly when the polymer particles are used as chromatography column particles.

Further, the monomer composition used in the present invention may comprise another monomer copolymerizable with the above multifunctional monomer having a plurality of N-substituted acrylamide groups. As such another monomer, either a non-crosslinkable (monofunctional) monomer or a crosslinkable (multifunctional) monomer can be used, and these may be used in combination. The solubility parameter δ of the another monomer is preferably 10.0 $(MPa)^{1/2}$ or more and 29.0 $(MPa)^{1/2}$ or less, more preferably 15.0 $(MPa)^{1/2}$ or more and 27.5 $(MPa)^{1/2}$ or less, further preferably 16.5 $(MPa)^{1/2}$ or more and 26.0 $(MPa)^{1/2}$ or less, and further preferably 17.5 $(MPa)^{1/2}$ or more and 24.0 $(MPa)^{1/2}$ or less in terms of obtaining the polymer particles with little gel adhesion.

As the above non-crosslinkable monomer, (meth)acrylamide-based monomers, styrene-based monomers, N-vinylamide-based monomers, vinyl ketone-based monomers, and acrylonitrile-based monomers are preferred.

Examples of the above (meth)acrylamide-based monomers include dimethylacrylamide (DMAAM) [23.9 (MPa)$^{1/2}$], diethylacrylamide (DEAAM) [20.7 (MPa)$^{1/2}$] propylacrylamide [22.0 (MPa)$^{1/2}$], isopropylacrylamide [21.6 (MPa)$^{1/2}$], acryloylmorpholine [28.0 (MPa)$^{1/2}$], acryloylpyrrolidine [27.9 (MPa)$^{1/2}$], and acryloylpiperidine [25.8 (MPa)$^{1/2}$].

Among the above (meth)acrylamide-based monomers, those represented by the following formula (3) are preferred.

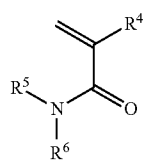

(3)

wherein $R^4$ represents a hydrogen atom or a methyl group, and $R^5$ and $R^6$ each independently represent a hydrogen atom or an alkyl group having 1 to 4 carbon atoms.

As the above $R^4$, a hydrogen atom is preferred. In addition, as $R^5$ and $R^6$, an alkyl group having 1 to 4 carbon atoms is preferred. Examples of the alkyl group include a methyl group, an ethyl group, a propyl group, and an isopropyl group. The number of carbon atoms of the alkyl group is preferably 1 or 2.

In addition, examples of the above styrene-based monomers include styrene [18.9 (MPa)$^{1/2}$], α-methylstyrene [18.8 (MPa)$^{1/2}$], halogenated styrenes [20.0-21.8 (MPa)$^{1/2}$] (fluorostyrene [20.0 (MPa)$^{1/2}$], chlorostyrene [21.0 (MPa)$^{1/2}$], bromostyrene [21.2 (MPa)$^{1/2}$], iodostyrene [21.8 (MPa)$^{1/2}$]), 4-methoxystyrene [19.2 (MPa)$^{1/2}$], 4-ethoxystyrene [19.0 (MPa)$^{1/2}$], and 1,2-dihydroxy-3-(4-vinylbenzyloxy)propane [28.0 (MPa)$^{1/2}$].

In addition, examples of the above N-vinylamide-based monomers include N-vinylformamide [26.1 (MPa)$^{1/2}$], N-vinylacetamide [23.5 (MPa)$^{1/2}$], N-vinylpropamide [22.6 (MPa)$^{1/2}$], N-vinylbutamide [22.0 (MPa)$^{1/2}$], N-methyl-N-vinylformamide [21.7 (MPa)$^{1/2}$], N-methyl-N-vinylacetamide [19.5 (MPa)$^{1/2}$], N-methyl-N-vinylpropamide [19.3 (MPa)$^{1/2}$], N-methyl-N-vinylbutamide [19.1 (MPa)$^{1/2}$], N-ethyl-N-vinylformamide [21.1 (MPa)$^{1/2}$], N-ethyl-N-vinylacetamide [19.3 (MPa)$^{1/2}$], N-ethyl-N-vinylpropamide [19.1 (MPa)$^{1/2}$], N-ethyl-N-vinylbutamide [18.9 (MPa)$^{1/2}$], N-propyl-N-vinylformamide [20.7 (MPa)$^{1/2}$], N-propyl-N-vinylacetamide [19.1 (MPa)$^{1/2}$], N-propyl-N-vinylpropamide [18.9 (MPa)$^{1/2}$], N-propyl-N-vinylbutamide [18.8 (MPa)$^{1/2}$], N-isopropyl-N-vinylformamide [20.3 (MPa)$^{1/2}$], N-isopropyl-N-vinylacetamide [18.8 (MPa)$^{1/2}$], N-isopropyl-N-vinylpropamide [18.7 (MPa)$^{1/2}$], and N-isopropyl-N-vinylbutamide [18.6 (MPa)$^{1/2}$].

In addition, examples of the above vinyl ketone-based monomers include acrolein [21.6 (MPa)$^{1/2}$], methyl vinyl ketone [17.7 (MPa)$^{1/2}$], ethyl vinyl ketone [17.7 (MPa)$^{1/2}$], propyl vinyl ketone [17.7 (MPa)$^{1/2}$], isopropyl vinyl ketone [17.2 (MPa)$^{1/2}$], methacrylolein [21.0 (MPa)$^{1/2}$], isopropenyl methyl ketone [17.8 (MPa)$^{1/2}$], isopropenyl ethyl ketone [17.7 (MPa)$^{1/2}$], isopropenyl propyl ketone [17.7 (MPa)$^{1/2}$], and isopropenyl isopropyl ketone [17.3 (MPa)$^{1/2}$].

In addition, examples of the above acrylonitrile-based monomers include acrylonitrile [22.7 (MPa)$^{1/2}$] and methacrylonitrile [22.0 (MPa)$^{1/2}$].

Among these non-crosslinkable monomers, (meth)acrylamide-based monomers are preferred when the alkali resistance is enhanced.

In addition, as the above crosslinkable monomer, bifunctional monomers are preferred, and epoxy group-containing unsaturated monomers are more preferred. Examples thereof include glycidyl methacrylate (GMA) [19.5 (MPa)$^{1/2}$], 3,4-epoxycyclohexylmethyl methacrylate (M100) [18.5 (MPa)$^{1/2}$], (4-vinylbenzyl)glycidyl ether (VBGE) [19.9 (MPa)$^{1/2}$], glycidyl acrylate [19.7 (MPa)$^{1/2}$], and allyl glycidyl ether [16.9 (MPa)$^{1/2}$]. As the bifunctional monomers, it is also possible to use hydroxyl group-containing unsaturated monomers such as hydroxyethylacrylamide [28.3 (MPa)$^{1/2}$] and hydroxypropylacrylamide [28.1 (MPa)$^{1/2}$]; carbonyl group-containing unsaturated monomers such as diacetone acrylamide [21.9 (MPa)$^{1/2}$] and 2-acetoacetoxyethyl methacrylate [21.1 (MPa)$^{1/2}$]; carboxylic acid group-containing unsaturated monomers such as methacrylic acid [22.0 (MPa)$^{1/2}$] and 4-vinylbenzoic acid [23.6 (MPa)$^{1/2}$]; and crosslinkable unsaturated monomers such as divinylbenzene [19.0 (MPa)$^{1/2}$].

When the alkali resistance of the particles is improved, among other monomers copolymerizable with the multifunctional monomer as described above, those having no carboxylate bond are preferred.

In addition, as the combination of monomers, a combination of the above multifunctional monomer having a plurality of N-substituted acrylamide groups, the above non-crosslinkable monomer, and the above crosslinkable monomer is preferred. Particularly, a combination of the above multifunctional monomer having a plurality of N-substituted acrylamide groups, a (meth)acrylamide-based monomer, and an epoxy group-containing unsaturated monomer, a combination of the above multifunctional monomer having a plurality of N-substituted acrylamide groups, an N-vinylamide-based monomer, and an epoxy group-containing unsaturated monomer, and a combination of the above multifunctional monomer having a plurality of N-substituted acrylamide groups, a vinyl ketone-based monomer, and an epoxy group-containing unsaturated monomer are preferred, and a combination of the above multifunctional monomer having a plurality of N-substituted acrylamide groups, a (meth)acrylamide-based monomer, and an epoxy group-containing unsaturated monomer is more preferred.

In addition, when the non-crosslinkable monomer and the crosslinkable monomer are used in combination in this manner, the amount of the non-crosslinkable monomer used is preferably 1 to 80 parts by mass, more preferably 1.5 to 50 parts by mass, and further preferably 10 to 40 parts by mass, based on 100 parts by mass of the above multifunctional monomer having a plurality of N-substituted acrylamide groups.

On the other hand, the amount of the crosslinkable monomer used is preferably 1 to 80 parts by mass, more preferably 5 to 25 parts by mass, and further preferably 5 to 20 parts by mass, based on 100 parts by mass of the above multifunctional monomer having a plurality of N-substituted acrylamide groups.

In addition, as the above monomer composition, one comprising an organic solvent is preferred. The organic solvent may comprise one or more organic solvents dissolving the above multifunctional monomer having a plurality of N-substituted acrylamide groups therein. By using an organic solvent acting as a pore-making agent, porous polymer particles can be produced. The pore-making agent is used for producing porous particles, and is present with the monomers in polymerization in oil droplets and has a role in forming pores as a non-polymerizable component. When smooth particles are produced, usually, the pore-making agent is not used.

Examples of such an organic solvent include aliphatic hydrocarbons such as hexane [solubility parameter: 15.0

(MPa)$^{1/2}$], heptane [15.2 (MPa)$^{1/2}$], octane [15.5 (MPa)$^{1/2}$], nonane [15.6 (MPa)$^{1/2}$], decane [15.8 (MPa)$^{1/2}$], and undecane [15.9 (MPa)$^{1/2}$] alicyclic hydrocarbons such as cyclohexane [8.1 (MPa)$^{1/2}$] and cyclopentane [8.1 (MPa)$^{1/2}$]; aromatic hydrocarbons such as benzene [21.2 (MPa)$^{1/2}$], toluene [18.2 (MPa)$^{1/2}$], xylene [18.6 (MPa)$^{1/2}$], naphthalene [21.2 (MPa)$^{1/2}$], and ethylbenzene [18.5 (MPa)$^{1/2}$]; halogenated hydrocarbons such as carbon tetrachloride [24.9 (MPa)$^{1/2}$] and tetrachloroethane [23.8 (MPa)$^{1/2}$]; aliphatic alcohols such as 1-butanol [23.2 (MPa)$^{1/2}$], 1-pentanol [22.4 (MPa)$^{1/2}$], 1-hexanol [21.9 (MPa)$^{1/2}$], 1-heptanol [21.4 (MPa)$^{1/2}$], 1-octanol [20.0 (MPa)$^{1/2}$], 4-methyl-2-pentanol [18.9 (MPa)$^{1/2}$], and 2-ethyl-1-hexanol [18.8 (MPa)$^{1/2}$]; alicyclic alcohols such as cyclohexanol [34.4 (MPa)$^{1/2}$]; aromatic alcohols such as 2-phenylethyl alcohol [22.5 (MPa)$^{1/2}$] and benzyl alcohol [23.3 (MPa)$^{1/2}$]; ketones such as diethyl ketone [17.2 (MPa)$^{1/2}$], methyl isobutyl ketone [16.9 (MPa)$^{1/2}$], diisobutyl ketone [16.8 (MPa)$^{1/2}$], acetophenone [20.9 (MPa)$^{1/2}$], 2-octanone [17.4 (MPa)$^{1/2}$], and cyclohexanone [20.1 (MPa)$^{1/2}$]; ethers such as dibutyl ether [15.6 (MPa)$^{1/2}$], diisobutyl ether [15.2 (MPa)$^{1/2}$], anisole [19.2 (MPa)$^{1/2}$], and ethoxybenzene [19.0 (MPa)$^{1/2}$]; and esters such as butyl acetate [17.6 (MPa)$^{1/2}$], isopentyl acetate [17.4 (MPa)$^{1/2}$], 3-methoxybutyl acetate [19.4 (MPa)$^{1/2}$], and diethyl malonate [19.5 (MPa)$^{1/2}$], as well as, linear polymers such as homopolymers of non-crosslinkable vinyl monomers. These organic solvents can be used singly, or two or more of these organic solvents can be mixed and used.

Among these, ketones, aromatic alcohols, and alicyclic hydrocarbons are preferred in terms of efficiently obtaining the polymer particles by the normal phase suspension polymerization method.

In addition, as the organic solvent, those comprising one or more organic solvents having a solubility parameter δ of 15 (MPa)$^{1/2}$ or more are preferred, those comprising one or more organic solvents having a solubility parameter δ of 17 (MPa)$^{1/2}$ or more are more preferred, and those comprising one or more organic solvents having a solubility parameter δ of 17 to 30 (MPa)$^{1/2}$ are more preferred in terms of obtaining the polymer particles with little gel adhesion. Further, in terms of obtaining the polymer particles with little gel adhesion as in the above, a mixed solution of an organic solvent having a solubility parameter δ of 19 (MPa)$^{1/2}$ or more and an organic solvent having a solubility parameter δ of less than 19 (MPa)$^{1/2}$ is preferred, and a mixed solution of an organic solvent having a solubility parameter δ of 17 to 19 (MPa)$^{1/2}$ or more and an organic solvent having a solubility parameter δ of less than 20 to 30 (MPa)$^{1/2}$ is more preferred.

The solubility parameter δ (in the case of a mixed solution, $\delta_{mix}$ described later) of the above organic solvent is preferably 15 to 30 (MPa)$^{1/2}$, more preferably 17 to 30 (MPa)$^{1/2}$, further preferably 17 to 26 (MPa)$^{1/2}$, and further preferably 17 to 22 (MPa)$^{1/2}$.

In addition, the upper limit of the absolute value of the difference between the solubility parameter δ of the multifunctional monomer having a plurality of N-substituted acrylamide groups and the solubility parameter δ (in the case of a mixed solution, $\delta_{mix}$ described later) of the organic solvent is more preferably 5.8 (MPa)$^{1/2}$ or less, further preferably less than 5.2 (MPa)$^{1/2}$, further preferably less than 4.9 (MPa)$^{1/2}$, and particularly preferably 4.5 (MPa)$^{1/2}$ or less in terms of obtaining porous polymer particles with little gel adhesion. On the other hand, its lower limit is preferably 1.7 (MPa)$^{1/2}$ or more, more preferably 2.5 (MPa)$^{1/2}$ or more, in terms of obtaining porous particles.

The solubility parameter of the above organic solvent can be calculated as for the multifunctional monomer, and when the organic solvent is a mixed solution composed of two or more, its solubility parameter $\delta_{mix}$ is obtained by the following formula.

$$\delta_{mix} = (\Sigma \delta_i^2 \phi_i)^{1/2} (MPa)^{1/2}$$

wherein $\delta_i$ represents the solubility parameter of each organic solvent constituting the mixed solution, and $\phi_i$ represents the volume fraction of the organic solvent; and it should be noted that $\phi_i$ is calculated assuming that the volume of the solvent has an additive property, and calculated assuming that the relationship of the total volume of the solvents=the sum of the volume of each solvent holds.

When the organic solvent is used, the amount of the organic solvent used is usually about 50 to 1000 parts by mass, preferably 100 to 600 parts by mass, more preferably 100 to 500 parts by mass, and further preferably 150 to 400 parts by mass, based on 100 parts by mass of the total amount of the monomers.

In addition, the production method of the present invention comprises dispersing the above monomer composition in an aqueous medium.

The aqueous medium is not particularly limited as long as it comprises water. Examples thereof include aqueous solutions of water-soluble polymers. Examples of the water-soluble polymers include hydroxyethyl cellulose, polyvinyl alcohol, carboxymethyl cellulose, starch, and gelatin.

The amount of the aqueous medium used is usually about 10 to 10000 parts by mass, preferably 100 to 10000 parts by mass, more preferably 500 to 6000 parts by mass, further preferably 500 to 3000 parts by mass, and particularly preferably 500 to 2000 parts by mass, based on 100 parts by mass of the total amount of the monomer composition.

In addition, when water is used as the dispersion medium of the aqueous medium, for example, a dispersion stabilizer such as calcium carbonate, sodium sulfate, sodium nitrite, calcium phosphate, or sodium chloride may be used. The amount of the dispersion stabilizer used is usually about 0.1 to 5 parts by mass based on 100 parts by mass of water.

In addition, the production method of the present invention comprises polymerizing the monomer composition dispersed as mentioned above. "Polymerizing the monomer composition" means polymerizing the monomers contained in the monomer composition. Such polymerization is usually performed in the presence of a polymerization initiator.

As the above polymerization initiator, a radical polymerization initiator is preferred. Examples of the radical polymerization initiator include azo initiators, peroxide-based initiators, and redox-based initiators, and specific examples include azobisisobutyronitrile, methyl azobisisobutyrate, azobis-2,4-dimethylvaleronitrile, benzoyl oxide, di-tert-butyl peroxide, and benzoyl peroxide-dimethylaniline. The amount of the polymerization initiator used is usually about 0.1 to 5 parts by mass based on 100 parts by mass of the total amount of the monomers.

In addition, various surfactants including anionic surfactants such as alkyl sulfate salts, alkylaryl sulfate salts, alkyl phosphate salts, and fatty acid salts can also be added to the reaction system as an emulsifier.

In addition, a polymerization inhibitor such as tert-butylpyrocatechol, benzoquinone, picric acid, hydroquinone, copper chloride, or ferric chloride and a polymerization auxiliary such as dodecyl mercaptan can also be added.

In addition, the polymerization temperature may depend on the polymerization initiator to be used. Preferred polymerization temperature is preferably within ±20° C., further preferably within ±10° C., around 10 hour half-life temperature+ 20° C. For example, when azobisisobutyronitrile is used as the polymerization initiator, the 10 hour half-life is about 60° C., and therefore, 60 to 100° C., which is within ±20° C. around 80° C., is preferred, and 70 to 90° C. is further preferred. When heating is performed, the polymerization initiator may be added before or after heating.

Further, the polymerization time is usually 2 to 20 hours, preferably 3 to 10 hours, and more preferably 4 to 10 hours.

The polymer particles formed by the above polymerization can be obtained by removing the pore-making agent and the unreacted monomers by distillation, extraction, washing, or the like as required.

According to the production method of the present invention, polymer particles can be produced from an acrylamide monomer by the normal phase suspension polymerization method. In other words, advantages of the production method of the present invention are that compared with a case where polymerization is performed by reversed phase suspension polymerization, the particle diameter and pore size of the polymer particles derived from the acrylamide monomer can be easily adjusted, and the polymer particles can be simply produced without a complicated procedure.

In addition, according to such a production method, porous polymer particles can be produced, and such porous polymer particles have high hydrophilicity and hardly form the non-specific adsorption of biopolymers and the like, and therefore are useful as a support for chromatography. Further, the polymer particles obtained by the production method of the present invention are useful as protein-bound particles in which a protein (for example, an immunoglobulin-binding protein such as protein A) as a primary probe for an antigen, an antibody, or the like is bound.

Particularly, as shown in Examples described later, among polymer particles which can be produced by the above production method, polymer particles comprising a structure represented by the formula (2) (tertiary crosslinkable acrylamide group) have excellent alkali resistance and antifouling properties (particularly coloration resistance) and therefore are useful as a support for chromatography. In addition, the polymer particles have high binding capacity for a biopolymer when a ligand is immobilized, and are particularly useful as a support for affinity chromatography in the biochemical field and protein-bound particles in which a protein (for example, an immunoglobulin-binding protein such as protein A) as a primary probe for an antigen, an antibody, or the like is bound.

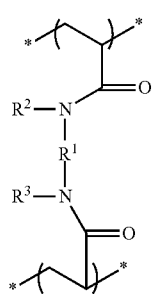

(2)

wherein $R^1$, $R^2$, and $R^3$ have the same meaning as defined above.

In addition, the total content of the tertiary crosslinkable acrylamide group represented by the formula (2) is preferably 20 to 99% by mass, more preferably 50 to 90% by mass, in the polymer particles in terms of the balance between a binding capacity when a ligand is immobilized and a column pressure.

Further, when the above non-crosslinkable monomer and the above crosslinkable monomer are used in combination for the polymer particles comprising the structure represented by the formula (2), the total content of the structural unit derived from the non-crosslinkable monomer in the polymer particles is preferably 1 to 80 parts by mass, more preferably 1.5 to 50 parts by mass, and further preferably 10 to 40 parts by mass, based on 100 parts by mass of the above crosslinkable acrylamide group.

On the other hand, the total content of the structural unit derived from the crosslinkable monomer in the polymer particles is preferably 1 to 80 parts by mass, more preferably 5 to 25 parts by mass, based on 100 parts by mass of the above crosslinkable acrylamide group.

In addition, the average particle diameter (volume average particle diameter) of the polymer particles obtained by the production method of the present invention and the polymer particles comprising the structure represented by the formula (2) (hereinafter, these are collectively referred to as the polymer particles of the present invention) is preferably 0.03 to 1000 μm, more preferably 10 to 600 μm, and further preferably 40 to 100 μm. Also, the variation coefficient of the average particle diameter of the polymer particles according to the present invention is preferably 30% or less, more preferably 25% or less, and further preferably 1 to 20%.

In addition, the polymer particles of the present invention may be either smooth particles or porous particles. In the case of the smooth particles, the specific surface area is naturally defined from their average particle diameter, and in the case of the porous particles, the specific surface area can be adjusted from their pore distribution. The specific surface area of the porous particles of the present invention is preferably 1 to 1000 m$^2$/g, more preferably 30 to 150 m$^2$/g.

The average particle diameter and the specific surface area can be measured by a flow type particle image analyzer, a mercury porosimeter, and the like in accordance with methods described in the Examples described later.

As the polymer particles of the present invention, preferred are polymer particles in which the total organic carbon in an eluate measured by a combustion catalytic oxidation type TOC meter is 200 ppm or less if the polymer particles are immersed in a 0.5 normal aqueous solution of sodium hydroxide at 23° C. for 22 hours in a state of being packed in a column.

A packing material for a chromatography column according to the present invention comprises the polymer particles of the present invention described above as a support. Such a packing material is suitable for use in affinity chromatography.

Also, examples of the above packing material include the polymer particles of the present invention described above on which a ligand is immobilized. The type of the ligand is not particularly limited as long as it has a moderate affinity for a target. For example, it is possible to use low molecular compounds such as proteins such as protein A, protein G, and avidin; peptides such as insulin; antibodies such as monoclonal antibodies; enzymes; hormones; DNA; RNA; carbohydrates such as heparin, Lewis X, and ganglioside; iminodiacetic acid, synthetic pigments, 2-aminophenylboronic acid, 4-aminobenzamidine, glutathione, biotin, and derivatives thereof. The ligands as described above may be used as such, but their fragments or fusion products obtained by recombinant or enzyme treatment or the like may be used. In addition, artificially synthesized peptides and peptide derivatives may be used. The ligands suited for the separation or purification of immunoglobulins are, for example, protein A and protein G, further preferably the immunoglobulin-binding domain of protein A.

Also, the chromatography column of the present invention is packed with the above packing material. The column is suitable for use in affinity chromatography.

Further, among the above packing material and chromatography column, those comprising the polymer particles comprising the structure represented by the formula (2) as a support have excellent alkali resistance and antifouling properties and have high binding capacity for a biopolymer, and therefore are very suitable for use in affinity chromatography.

EXAMPLES

The present invention is described in detail below by giving Examples, but the present invention is not limited to these Examples.

The analysis conditions in the Examples are as shown below.

<Average Particle Diameter and Variation Coefficient>

The average particle diameter (volume average particle diameter) and the variation coefficient were measured by using a flow type particle image analyzer (model FPIA-3000) manufactured by SYSMEX CORPORATION and setting the total count to 500 for a sample diluted with water in such a way that a solid concentration is about 2.5%.

<Specific Surface Area>

The specific surface area was measured using AutoPore IV9520 manufactured by SHIMADZU CORPORATION under conditions in which the measurement range was a pore diameter range of 10 to 5000 nm, for a sample obtained by vacuum drying in a tert-butyl alcohol solvent.

Example 1

0.9 g of (4-vinylbenzyl)glycidyl ether (manufactured by Toray Fine Chemicals Co., Ltd.), 0.9 g of N,N-dimethylacrylamide (manufactured by KOHJIN Film & Chemicals Co., Ltd.), 0.9 g of N,N-diethylacrylamide (manufactured by KOHJIN Film F. Chemicals Co., Ltd.) and 6.1 g of N,N'-diethyl-1,3-bis(acrylamido)propane (manufactured by JSR) were dissolved in 18.1 g of a 7:3 mixed solution (mass ratio) of 2-octanone (manufactured by Toyo Gosei Co., Ltd) and acetophenone (manufactured by Inoue Perfumery MFG. Co., Ltd.) to prepare an organic monomer solution.

On the other hand, 2.5 g of polyvinyl alcohol (manufactured by KURARAY CO., LTD.: PVA-217), 0.2 g of sodium dodecyl sulfate (manufactured by Kao Corporation: EMAL 10G), 2.5 g of sodium sulfate (manufactured by Wako Pure Chemical Industries, Ltd.) and 1.2 g of sodium nitrite (manufactured by Wako Pure Chemical Industries, Ltd.) were added to 245 g of pure water, and stirred to prepare an aqueous solution. This aqueous solution was introduced into a 500 mL separable flask, and the separable flask was fitted with a thermometer, a stirring blade and a cooling tube. The separable flask was set in a hot water bath, and stirring was started at 360 rpm under a nitrogen atmosphere. Then, the above organic monomer solution was added to the separable flask, and the separable flask was heated by the hot water bath. When the liquid temperature reached 85° C., 0.1 g of 2,2'-azobisisobutyronitrile (manufactured by Wako Pure Chemical Industries, Ltd.) was added, and stirring was performed for 3.5 hours. The reaction product was cooled and then transferred to a 500 mL polypropylene bottle to settle polymer particles. The supernatant liquid was discarded by decantation, and the remaining polymer particles were washed with water and ethanol.

The obtained polymer particles were porous particles having an average particle diameter of 46 μm, a variation coefficient of 15% and a specific surface area of 94 m$^2$/g. An SEM photograph of the obtained polymer particles are shown in FIG. 1.

Example 2

Polymer particles were produced by the same manner as in Example 1, except that N,N'-diethyl-1,6-bis(acrylamido)hexane (manufactured by JSR) was used instead of N,N'-diethyl-1,3-bis(acrylamido)propane, 2-octanone was used instead of the mixed solution of 2-octanone and acetophenone, and the stirring rate was changed to 280 rpm.

The obtained polymer particles were porous particles having an average particle diameter of 39 μm, a variation coefficient of 14% and a specific surface area of 62 m$^2$/g.

Example 3

Polymer particles were produced by the same manner as in Example 1, except that 3,4-epoxycyclohexylmethyl methacrylate (manufactured by Daicel Corporation: CYCLOMER M100) was used instead of (4-vinylbenzyl) glycidyl ether, the mass ratio of the mixed solution of 2-octanone and acetophenone was changed from 7:3 to 6:4, 0.5 g of polyvinyl alcohol (manufactured by KURARAY CO., LTD.: PVA-405) was further used in addition to the above polyvinyl alcohol, sodium dodecyl sulfate, sodium sulfate and sodium nitrite to prepare an aqueous solution, the temperature at which the organic monomer solution was added was changed from room temperature to 85° C., and the stirring rate was changed to 375 rpm.

The obtained polymer particles were porous particles having an average particle diameter of 52 μm, a variation coefficient of 15% and a specific surface area of 94 m$^2$/g.

Example 4

Polymer particles were produced by the same manner as in Example 3, except that 0.4 g of glycidyl methacrylate (manufactured by MITSUBISHI RAYON CO., LTD.) was used instead of 3,4-epoxycyclohexylmethyl methacrylate, the amount of N,N-dimethylacrylamide used was changed to 1.1 g, the amount of N,N-diethylacrylamide used was changed to 1.1 g, the mass ratio of the mixed solution of 2-octanone and acetophenone was changed from 6:4 to 4:6, and the stirring rate was changed to 345 rpm.

The obtained polymer particles were porous particles having an average particle diameter of 56 μm, a variation coefficient of 12% and a specific surface area of 97 m$^2$/g.

Example 5

Polymer particles were produced by the same manner as in Example 1, except that the monomers were changed to 0.9 g of (4-vinylbenzyl)glycidyl ether, 1.8 g of N,N-dimethylacrylamide, and 6.1 g of N,N'-diethyl-1,3-bis(acrylamido)propane, acetophenone was used instead of the mixed solution of 2-octanone and acetophenone, the amount of polyvinyl alcohol used was changed to 0.5 g, the amounts of sodium dodecyl sulfate and sodium sulfate used were each changed to 0.1 g, and the stirring rate was changed to 330 rpm.

The obtained polymer particles were porous particles having an average particle diameter of 103 μm, a variation coefficient of 39% and a specific surface area of 21.3 m²/g.

Example 6

0.6 g of (4-vinylbenzyl)glycidyl ether, 1.3 g of N,N-diethylacrylamide, and 4.4 g of 1,4-bis(acryloyl)piperazine (manufactured by Bio-Rad) were dissolved in 26.0 g of acetophenone to prepare an organic monomer solution.

On the other hand, 1.5 g of polyvinyl alcohol, 0.1 g of sodium dodecyl sulfate, 2.6 g of sodium sulfate and 1.3 g of sodium nitrite were added to 263 g of pure water and stirred to prepare an aqueous solution.

Polymer particles were produced by the same manner as in Example 1, except that the above organic monomer solution and aqueous solution were used, and the stirring rate was changed to 450 rpm.

The obtained polymer particles had an average particle diameter of 55 μm, a variation coefficient of 26%, and a specific surface area of 100 m²/q.

Example 7

Polymer particles were produced by the same manner as in Example 5, except that N,N-diethylacrylamide was used instead of N,N-dimethylacrylamide, and a 8:2 mixed solution (mass ratio) of 2-octanone (manufactured by Toyo Gosei Co., Ltd) and acetophenone (manufactured by Inoue Perfumery MFG. Co., Ltd.) was used instead of acetophenone.

The obtained polymer particles had an average particle diameter of 70 μm, a variation coefficient of 38% and a specific surface area of 100 m²/g.

Example 8

Polymer particles were produced by the same manner as in Example 7, except that 2-octanone was used instead of the mixed solution of 2-octanone and acetophenone.

The obtained polymer particles had an average particle diameter of 76 μm, a variation coefficient of 48% and a specific surface area of 27.5 m²/g.

Example 9

Polymer particles were produced by the same manner as in Example 8, except that diisobutyl ketone was used instead of 2-octanone.

The obtained polymer particles had an average particle diameter of 90 μm, a variation coefficient of 35% and a specific surface area of 36.3 m²/g.

Example 10

Polymer particles were produced by the same manner as in Example 8, except that isopentyl acetate was used instead of 2-octanone.

The obtained polymer particles had an average particle diameter of 79.0 μm, a variation coefficient of 42%, and a specific surface area of 25.3 m²/g.

Example 11

Polymer particles were produced by the same manner as in Example 2, except that diisobutyl ketone was used instead of 2-octanone.

The obtained polymer particles had an average particle diameter of 70.3 μm, a variation coefficient of 29.1%, and a specific surface area of 8.5 m²/g.

Test Example 1

The surfaces of the polymer particles obtained in Examples 1 to 11 were observed by an SEM, and evaluated in accordance with the following criteria. The "Absolute value" in the Table means the absolute value of the difference between the solubility parameter of the multifunctional monomer and the solubility parameter of the organic solvent.

(Polymer Particle Evaluation Criteria)

a: Little gel adhesion is observed, and the polymer particles are porous.

b: Little gel adhesion is observed, but few pores can be found.

c: Gel adhesion is observed.

TABLE 1

|  | Multifunctional monomer | | Solvent | | | Particle |
|---|---|---|---|---|---|---|
|  | Type | Solubility parameter | Type | Solubility parameter | Absolute value | surface gel evaluation |
| Example 1 | DEAAP | 22.6 | 2-Octanone/acetophenone | 18.35 | 4.25 | a |
| Example 2 | DEAAH | 21.7 | 2-Octanone | 17.4 | 4.30 | b |
| Example 3 | DEAAP | 22.6 | 2-Octanone/acetophenone | 18.77 | 3.83 | a |
| Example 4 | DEAAP | 22.6 | 2-Octanone/acetophenone | 19.38 | 3.22 | a |
| Example 5 | DEAAP | 22.6 | Acetophenone | 20.9 | 1.70 | b |
| Example 6 | BAP | 23.6 | Acetophenone | 20.9 | 2.70 | c |
| Example 7 | DEAAP | 22.6 | 2-Octanone/acetophenone | 17.71 | 4.89 | a |
| Example 8 | DEAAP | 22.6 | 2-Octanone | 17.4 | 5.20 | c |
| Example 9 | DEAAP | 22.6 | Diisobutyl ketone | 16.8 | 5.80 | c |
| Example 10 | DEAAP | 22.6 | Isopentyl acetate | 17.4 | 5.20 | c |
| Example 11 | DEAAH | 21.7 | Diisobutyl ketone | 16.8 | 4.90 | c |

Comparative Example 1

An organic monomer solution was prepared by the same manner as in Example 1, except that N,N'-dimethyl-bis(acrylamido)ethane (manufactured by JSR) was used instead of N,N'-diethyl-1,3-bis(acrylamido)propane, and the mass ratio of the mixed solution of 2-octanone and acetophenone was changed from 7:3 to 5:5.

Then, an aqueous solution prepared by the same manner as in Example 1 was introduced into a 500 mL separable flask, and the separable flask was fitted with a thermometer, a stirring blade and a cooling tube. The separable flask was set in a hot water bath, and stirring was started at 300 rpm under a nitrogen atmosphere. The above organic monomer solution was added to this, and the separable flask was heated by the hot water bath. When the liquid temperature reached 85° C., 0.1 g of 2,2'-azobisisobutyronitrile (manufactured by Wako Pure Chemical Industries, Ltd.) was added.

As a result, the N,N'-dimethyl-bis(acrylamido)ethane was dissolved in the aqueous solution without being dispersed, and normal phase suspension polymerization could not occur.

Comparative Example 2

0.9 g of (4-vinylbenzyl)glycidyl ether, 0.9 g of N,N-dimethylacrylamide, 0.9 g of N,N-diethylacrylamide and 6.1 g of bis(acrylamido)methane (manufactured by Alfa Aesar) were added to 18.1 g of a 7:3 mixed solution (mass ratio) of 2-octanone and acetophenone. As a result of that, the organic monomers were not dissolved in the mixed solution, and normal phase suspension polymerization could not be performed.

Reference Example 1

1.0 g of glycidyl methacrylate (manufactured by MITSUBISHI RAYON CO., LTD.), 2.0 g of glycerin 1-methacrylate (manufactured by NOF CORPORATION) and 6.9 g of glycerol 1,3-dimethacrylate (manufactured by Shin-Nakamura Chemical Co., Ltd.) were dissolved in 20.3 g of a 3:7 mixed solution (mass ratio) of 2-octanone and acetophenone to prepare an organic monomer solution.

On the other hand, 0.5 g of polyvinyl alcohol, 0.1 g of sodium dodecyl sulfate, 0.2 g of sodium carbonate and 1.2 g of sodium nitrite were added to 248 g of pure water and stirred to prepare an aqueous solution.

Polymer particles were produced by the same manner as in Example 1, except that the above organic monomer solution and the aqueous solution were used, and the stirring rate was changed to 400 rpm.

The obtained polymer particles had an average particle diameter of 50 µm, a variation coefficient of 17% and a specific surface area of 104 m$^2$/g.

Test Example 2

Measurement Test for Binding Capacity of Biopolymer

Protein A was immobilized on polymer particles shown in the following Table 2, and the dynamic binding capacity for human polyclonal IgG was measured by the amount of adsorption at a linear flow rate of 300 cm/hr, a column volume of 4 mL (5 mm φ×200 mm length) and 10% breakthrough at the elution tip using AKTAprime plus manufactured by GE Healthcare Bio-Sciences Corp. The results are shown in Table 2.

TABLE 2

| | Monomer composition | (mg/mL) |
|---|---|---|
| Example 1 | VBGE/DMAAM/DEAAM/DEAAP | 42 |
| Example 6 | VBGE/DEAAM/BAP | 34 |

TABLE 2-continued

| | Monomer composition | (mg/mL) |
|---|---|---|
| Reference Example 1 | GMA/GLM/GLDM | 40 |

VBGE: (4-vinylbenzyl) glycidyl ether,
DMAAM: N,N-dimethylacrylamide,
DEAAM: N,N-diethylacrylamide,
DEAAP: N,N'-diethyl-1,3-bis(acrylamido)propane,
BAP: 1,4-bis(acryloyl)piperazine,
GMA: glycidyl methacrylate,
GLM: glycerin 1-methacrylate,
GLDM: glycerol 1,3-dimethacrylate As shown in Table 2, the polymer particles of Example 1 have high binding capacity for biopolymer if Protein A is immobilized.

Test Example 3

Alkali Resistance Test

Polymer particles shown in the following Table 3 were packed in a tricorn column (inner diameter 0.5 cm) manufactured by GE Healthcare so that a height of the packed bed was 4 cm, and the column was connected to a chromatography system (trade name AKTAprime) manufactured by GE Healthcare installed in a constant temperature room at 23° C. Then, 10 mL of pure water was passed at a rate of 1 mL/min for washing. After that, 10 mL of a 0.5 normal aqueous solution of sodium hydroxide was passed at a rate of 1 mL/min and stopped, and allowed to stand for 22 hours to elute alkali decomposition components. Then, the 0.5 normal aqueous solution of sodium hydroxide was passed at a rate of 1 mL/min, and 0.8 mL of the eluate in the column was collected and immediately acidified with 9.2 mL of 0.1 normal hydrochloric acid. The amount of total organic carbon in the above acidified solution was measured with an injection volume of 30 µL using a combustion catalytic oxidation type TOC meter (model TOC-5000) manufactured by SHIMADZU CORPORATION, and this value was increased 12.5 times to correct dilution by acidification. The results are shown in Table 3.

TABLE 3

| | Monomer composition | (ppm) |
|---|---|---|
| Example 1 | VBGE/DMAAM/DEAAM/DEAAP | 50 |
| Reference Example 1 | GMA/GLM/GLDM | 760 |

As shown in Table 3, the polymer particles of Example 1 have excellent alkali resistance.

Test Example 4

Coloration Resistance Test

Polymer particles shown in the following Table 4 were packed in a tricorn column (inner diameter 0.5 cm) manufactured by GE Healthcare so that a height of the packed bed was 4 cm, and the column was connected to the chromatography system (trade name AKTAprime) manufactured by GE Healthcare installed in the constant temperature room at 23° C. After that, 4 mL of an aqueous solution of 20 mM Na phosphate/150 mM NaCl (pH 7.5) comprising 0.0015% by mass of phenol red was passed, and then, 4 mL of 20 mM Na phosphate/150 mM NaCl (pH 7.5) was passed for washing. The uncolored column by visual observation was recorded as b, and the colored column was recorded as d.

TABLE 4

|  | Monomer composition | Coloration |
|---|---|---|
| Example 1 | VBGE/DMAAM/DEAAM/DEAAP | b |
| Reference Example 1 | GMA/GLM/GLDM | d |

As shown in Table 4, the polymer particles of Example 1 have excellent coloration resistance.

The invention claimed is:

1. A method for producing polymer particles, the method comprising:
dispersing, in an aqueous medium, a monomer composition comprising a multifunctional monomer having formula (1):

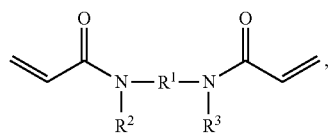

(1)

wherein:
$R^1$ is an alkylene group having from 2 to 8 carbon atoms; and
$R^2$ and $R^3$ are each an alkyl group having from 1 to 3 carbon atoms, or
$R^2$ and $R^3$ optionally together form a heterocycle with an adjacent nitrogen atom and $R^1$,
with the proviso that a total number of carbon atoms of $R^1$, $R^2$, and $R^3$ is 5 or more; and
normal phase suspension polymerizing the dispersed monomer composition.

2. The method according to claim 1, wherein the monomer composition further comprises an organic solvent dissolving the multifunctional monomer.

3. The method according to claim 2, wherein a solubility parameter of the organic solvent is 17 $(MPa)^{1/2}$ or more.

4. The method according to claim 2, wherein an absolute value of a difference between a solubility parameter of the multifunctional monomer and the solubility' parameter of the organic solvent is 5.8 $(MPa)^{1/2}$ or less.

5. The method according to claim 2, wherein the organic solvent is a mixed solution of an organic solvent having a solubility parameter of 19 $(MPa)^{1/2}$ or more and an organic solvent having a solubility parameter of less than 19 $(MPa)^{1/2}$.

6. The method according to claim 1, wherein the monomer composition further comprises at least one monomer selected from the group consisting of a (meth)acrylamide-based monomer, a styrene-based monomer, an N-vinylamide-based monomer, a vinyl ketone-based monomer, an acrylonitrile-based monomer, and an epoxy group-containing unsaturated monomer.

7. The method according to claim 6, wherein the monomer composition comprises a (meth)acrylamide-based monomer of formula (3):

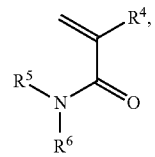

(3)

wherein:
$R^4$ is a hydrogen atom or a methyl group; and
$R^5$ and $R^6$ are each independently a hydrogen atom or an alkyl group having from 1 to 4 carbon atoms.

8. Polymer particles produced by the method according to claim 1.

9. Polymer particles comprising a structure of formula (2):

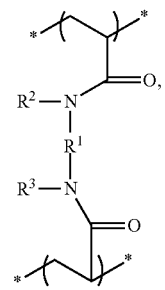

(2)

wherein:
$R^1$ is an alkylene group having from 2 to 8 carbon atoms; and
$R^2$ and $R^3$ are each an alkyl group having from 1 to 3 carbon atoms, or
$R^2$ and $R^3$ optionally together form a heterocycle with an adjacent nitrogen atom and $R^1$,
with the proviso that a total number of carbon atoms of $R^1$, $R^2$, and $R^3$ is 5 or more.

10. The polymer particles according to claim 9, further comprising a structural unit derived from at least one monomer selected from the group consisting of a (meth)acrylamide-based monomer, a styrene-based monomer, an N-vinylamide-based monomer, a vinyl ketone-based monomer, an acrylonitrile-based monomer, and an epoxy group-containing unsaturated monomer.

11. The polymer particles according to claim 10, comprising a structural unit derived from a (meth)acrylamide-based monomer of formula (3):

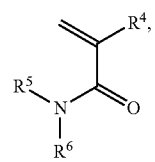

(3)

wherein:
$R^4$ is a hydrogen atom or a methyl group; and
$R^5$ and $R^6$ are each independently a hydrogen atom or an alkyl group having from 1 to 4 carbon atoms.

12. A packing material comprising the polymer particles according to claim 8 as a support, wherein the packing material is suitable for a chromatography column.

13. A packing material comprising the polymer particles according to claim 8 and a ligand immobilized thereon, wherein the packing material is suitable for affinity chromatography.

14. The packing material according to claim 13, wherein the ligand is an immunoglobulin-binding protein.

15. A chromatography column packed with the packing material according to claim 12.

* * * * *